United States Patent [19]

Grodzins

[11] Patent Number: 4,920,270
[45] Date of Patent: Apr. 24, 1990

[54] RADON DETECTION

[76] Inventor: Lee Grodzins, 14 Stratham Rd., Lexington, Mass. 02173

[21] Appl. No.: 94,192

[22] Filed: Sep. 8, 1987

[51] Int. Cl.$^5$ .................... G01T 1/204; G01T 1/169
[52] U.S. Cl. .................................. 250/364; 250/255
[58] Field of Search ................ 250/364, 255, 253

Primary Examiner—Janice A. Howell
Assistant Examiner—Richard E. Hanig
Attorney, Agent, or Firm—Rines and Rines, Shapiro and Shapiro

[57] ABSTRACT

Detection and quantitative measurement of the radioactive isotope of $^{222}Rn$, as encountered in air in habitats is accomplished in a passive detection system in which the radon at the test site is adsorbed into an adsorbent, e.g. activated charcoal, held in a vial made especially for liquid scintillation counting, and the radon is subsequently desorbed into a liquid scintillation desorbent placed in the same vial and the counting of the radon activity in the vial is accomplished by liquid scintillation techniques.

17 Claims, 4 Drawing Sheets

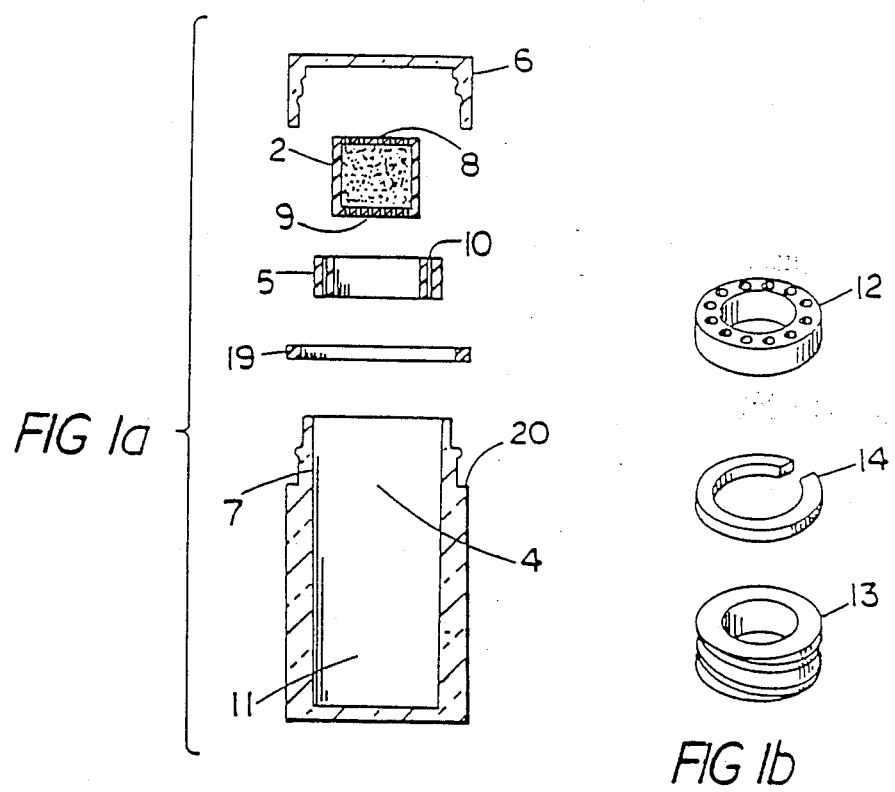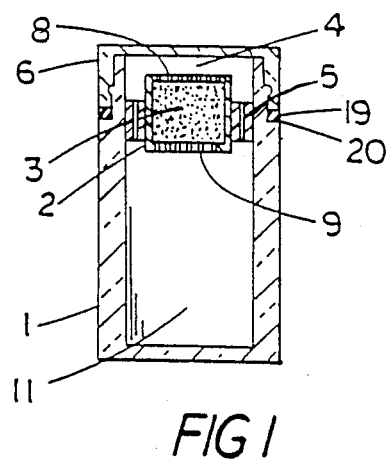

RADON DETECTION

BACKGROUND OF THE INVENTION

This invention relates to the detection and quantitative measurement of the radioactive isotope of radon, $^{222}$Rn, as encountered in air in habitats such as in typical and public buildings, and particularly it relates to a passive detection system in which the radon at the test site is adsorbed into an adsorbent such as activated charcoal.

$^{222}$Rn is a radioactive decay product of $^{238}$U which occurs naturally in the earth's crust and especially in granite rocks. $^{222}$Rn is often referred to simply as radon and that terminology will be employed here. That is, radon, as herein used, is defined to mean the specific isotope $^{222}$Rn which has a half-life of 3.82 days, decaying predominantly to the isotope $^{218}$Po with the emission of an alpha particle of 5.49 MeV of energy.

Radon is the heaviest of the inert gasses, the end of the series beginning with helium and neon. When produced, it has the properties and the lifetime to diffuse out of the minerals in which it forms and becomes a constituent of the air we breathe. Techniques for its collection and measurement date from its discovery in 1900. Today, private and public actions to understand and alleviate the problems posed by unacceptable levels of radon require accurate measurements of the radon concentration in buildings.

Radon accounts for most of the naturally occurring ionizing radiation burden to the general population. But, because radon itself is insert, it is not considered a health hazard. Harmful effects result primarily from the decay radiations from the progeny of the radon, all of which are chemically very active. There are five sequential decays which occur in the first few hours following the decay of $^{222}$Ra. The immediate daughter of $^{222}$Ra is $^{218}$Po which t ransmutes in 3.05 minutes into $^{214}$Pb by emitting a 6.0 MeV alpha particle. $^{214}$Pb decays in turn with a half-life of 26.8 minutes, with the emission of an electron and, generally, a gamma ray, to an isotope of bismuth, $^{214}$Bi, which itself decays to $^{214}$Po in 19.8 minutes by emitting an electron and, generally, a gamma ray. Finally, $^{214}$Po decays in 164 microseconds by emitting a 7.687 MeV alpha particle. In summary, a sequence of short-lived transmutations takes place following each radon decay, and each step yields easily detectable radiation. In a matter of hours, three alpha particles, two electrons, and about two gamma rays are emitted for every radon decay.

The dangers posed by radon have led to guidelines for the permissible levels of radon in air. In domestic environments the U.S. Environmental Protection Agency recommends that an average yearly concentration should not exceed 4 picoCuries per liter of air; henceforth, 4 pCi/l. Once Curie represents a radioactivity level of $3.7 \times 10^{10}$ disintegrations per second. One pCi equals $3.7 \times 10^{-2}$ disintegrations per second or 2.2 disintegrations per minute. The EPA criterion is, therefore, $4 \times 2.2 = 8.8$ disintegrations of radon per minute per liter of air. The total number of disintegration per minute per liter of air containing 4 pCi/l of radon is then $5 \times 8.8 = 44$ dpm. The importance of the radon problem may be judged by the fact that the EPA estimates that as many as 20% of the homes in the United States, between 15 and 20 million homes, may have radon levels which exceed 4 pCi/l.

The preponderance of radon measurements of air carried out in recent years have used passive methods in which the radon-bearing air is allowed to diffuse into activated charcoal; charcoal has been found to be the most effective adsorbent of radon from the air since it was first used about 1910; other adsorbents may be used and more effective ones may yet be found but we will use activated charcoal as the standard example. We note, however, that the invention does not depend on activated charcoal; any radon adsorbent can be used providing that the radon can be desorbed into a liquid scintillation cocktail.

After the charcoal has been saturated with radon (which takes from 1 to 7 days depending on the design of the passive detector) the radon concentration may be determined by one of several sophisticated techniques.

The best-known method for determining the radon, adsorbed by the activated charcoal, measures the gamma radiation emitted in the decay of two of the progeny of radon. Liquid scintillation methods, used in this invention, detect all the charged particles emitted in the decay of radon and its progeny. The LS technique has not been widely accepted though it has been known for years and is acknowledged to be one of the most sensitive techniques for determining low levels of radon. The main reason for the poor reception of LS methods is the complexity of the desorption procedure as described in the literature. Since the thrust of this invention is to simplify that procedure so that the technique will gain wider acceptance, we first review the relative advantages and disadvantages of the gamma ray and liquid scintillation techniques for determining the radon concentration in charcoal, and then show how the present invention obviates the principal disadvantage of the LS technique.

Activated charcoal is a highly effective adsorbent of the radon in the air; one gram at room temperature pulls the radon from about 4 liters. The charcoal, placed in a porous container, accumulates the radon out of the air until saturation is reached. The container is then sealed and sent to the appropriate laboratory for measurement of the radon content; portable measuring systems are practical but are not now being utilized. The gamma ray technique determines the radon concentration from the intensity of the gamma rays emitted in the third and fourth links in the decay chain of radon. That is, the rate of gamma rays emitted in the decay of $^{214}$Po to $^{214}$Bi and the subsequent decay of $^{214}$Bi to $^{214}$Po can be related in a straightforward manner to the rate of decay of radon atoms in the charcoal sample. The method has many advantages. First, large amounts of charcoal can be used, giving a strong signal, since the gamma rays can penetrate many centimeters of charcoal without being attenuated. Second, the penetrating power of the gamma rays makes practical the use of a metal container for the carbon which need not be disturbed for measurement; that is, the measurement can be carried out by simply placing the unopened charcoal-containing canister in front of the gamma ray detector. Third, the canisters are robust and can be recycled for multiple use without undue difficulty. Fourth, the gamma ray counting apparatus is commercially available.

However, the gamma-ray counting method has serious disadvantages. First, only two of the five links in the radon chain are detected so that the greater part of the radon signal is ignored. Second, the detection of gamma rays is not very efficient; a 3" Diam × 3" detector (the one generally used) counts only about 10% of the gamma rays emitted by the radon daughters in these charcoal canisters. Third, the low efficiency of detection necessitates using 25 to 100 grams of charcoal. Thus the ability to use large amounts of charcoal is a practical requirement. The charcoal-filled metal canisters are bulky and the costly to ship quickly, as radon testing requires. Shipping costs can make up a substantial cost of the radon test. Fourth, moisture problems, which can give apparent radon values which are two to three time smaller than the true values, cannot be alleviated in practice by the use of desiccants which must be the same weight as the charcoal to be effective. Fifth, while counting facilities utilizing personal computers are commercial available, there are not automated conveyer feeds for the metal canisters. They must be loaded into place by hand for each measurement. Sixth, the background counts in the large NaI detectors are substantial and make it difficult to measure low radon levels in a short time. The importance of this point is emphasized by the values quoted in the standard reference on the technique of measuring radon concentrations in charcoal through the counting of the gamma radiation. In that work, Bernard I. Cohen and Richard Nason, Health Physics, Vol. 50 1986, pages 457–463, give a detailed description of the method now in common use. On page 462, they quote the true counts and the background counts for their system after a 25 gram charcoal canister was exposed to 1 pCi/liter. The overall result for a 30 minute counting time is 260 true counts compared to a background of about 1600 counts in the same time interval. The system described by Cohen and Nasan evolved over several years of development and it must be assumed that their signal to noise results are close to the optimum for a practical system. It should be noted that increasing the size of the detector will give greater detection efficiency but will also increase the background counts and the ratio of signal to background will not be greatly affected.

Each of the disadvantages of gamma ray detection are offset if the radon in the charcoal is measured by liquid scintillation counter (LSC) techniques. First, the LSC technique detects all the charged particles which result from a radon decay. Thus it detects 5 signals rather than 2 for each decay of radon. Second, the liquid scintillation (LS) technique has close to 100% efficiency for detection of these high energy charged particles. This gives the LSC method a further advantage of almost an order of magnitude greater sensitivity. Third, the background counts of 15 to 25 counts per minute are typically ten times lower for LSC than for gamma ray detection, primarily because the liquid scintillant has much smaller volume than the NaI(Tl). These three advantages give the LSC technique a 100 fold advantage over the gamma ray detection technique, so that LSC is more effective for radon detection using a two gram adsorbent than is a 25 gram adsorbent using gamma ray detection. Fourth, the small weight of adsorbent gives the method a further advantage, since it makes practical the use of desiccants of the same volume to obviate humidity problems. The small size of the LS detectors also significantly reduces the cost of mailing and handling. Fifth, the LS counters for small (<20 cc) samples, commonly used in biomedical areas, have automated counting and sample handling. A typical LS counter can be loaded with 200 more samples for computer controlled measurement. There are some 10,000 LS counters in the field.

To emphasize the inherent advantages of LS over gamma ray techniques, we compare the time needed to obtain the same statistical accuracy in the two methods when the activated charcoal is exposed to a radon atmosphere of 1 pCi/l, a typical value found in homes. At this radon level, Cohen and Nasen, using gamma rays, report a signal to background ratio of 260:1600 for a 30 minute counting time of their 25 g of charcoal; the statistical uncertainty is 23%. Using the liquid scintillation technique and a 2 g charcoal detector, we obtain 55 counts per minute from the radon versus 25 counts per minute from the background. In one minute of counting we obtain the value of the radon concentration with the same statistical uncertainty that took 30 minutes with gamma ray counting. One will appreciate that there are commercial advantages to reducing the counting time of an expensive instrument by a factor of 30 while using 12 time less charcoal.

The single advantage enjoyed by gamma ray detection over LS detection is that of simplicity of the counting procedure. The only manipulation of the aluminum charcoal canister is in feeding it on and off the gamma ray detector. The LS method, as described by Prichard and Marien in the well known paper:

Desorption of radon from activated Carbon into a Liquid Scintillator, Analytic Chemistry 55, 155–157, 1983, involves complex steps. Until now, this has been the factor which has deterred potential uses of the LSC techniques and has been the decisive advantage favoring the gamma ray method. The elution procedure is the central problem addressed in the Prichard-Marien paper. Since we will contrast the simplicity of the present invention with the complexity of the Prichard-Marien technique, we quote their procedure in pertinent part below.

The prepared carbon was exposed to radon gas (and) transferred to an. 80-mL separatory funnel connected to a 60-mL flask containing a known volume of reagent grade toluene. When the stopcock was opened, the toluene flowed down onto the carbon, producing an exothermic outgassing reaction. The evolved gas passed upward through the toluene, affording an opportunity for any radon in the gas to be transferred to the liquid. After a few seconds of gentle shaking the toluene passed entirely into the funnel and the stopcock was closed . . . After a wait of at least 2 h for desorption, the funnel was shaken and inverted, a syringe attached below the stopcock. the free liquid portion removed. The toluene [together with 1 or 2 mL of concentrated fluor solution] was transferred to a 22-mL glass liquid scintillation vial for . . . counting after a 3-h delay for the ingrowth of radon daughters.

The Pritchard/Marien technique involves the following steps: 1. The radonbearing carbon is transferred to a separatory funnel. 2. A known volume of toluene is flowed into the carbon. 3. The funnel is shaken for a few seconds and the stopcock closed. 4. After two hours desorption time the funnel is shaken again and inverted. 5. 1 to 2 ml of concentrated fluor (the scintillant) solution is added to the toluene. 6. The cocktail is transferred to a 22 ml glass LS vial for counting which is down 3 hours after the transfer.

SUMMARY OF THE INVENTION

The complexity of the Pritchard-Marien procedure as contrasted with the simplicity of the Cohen-Nasen method has been the deterrent to the adoption of LSC for measuring radon in charcoal. The present invention, by contrast, describes a radon detector device by which the radon can be desorbed from the charcoal in one quick procedural step. The charcoal is never handled, the detector is never disassembled, there is little room for variability of protocol, and procedures are reproducible. The resulting system is easy to construct and simple to use. The simplicity of the protocol is comparable to that of the gamma ray method. When that simplicity is coupled to the availability of automated LSC counters accepting hundreds of samples, the advantages swing strongly to LS methods for counting radon.

The invention is both a device and a method for measuring radon in air by adsorbing the radon into an adsorbent and using liquid scintillation counting techniques to measure the radon adsorbed. The central idea is that a single device is the vehicle for both the adsorption of the radon from the air and the subsequent desorption of the radon for measurement in the laboratory. Radon is absorbed by activated charcoal contained in a porous holder that is fixed in the neck of a resealable vial. The vial is a standard container whose dimensions and properties are suitable for use in a commercial liquid scintillation counter (LS). The measurement of the radon is carried out by unsealing the cap of the vial and exposing the charcoal to the ambient air for a prescribed time. The vial is then sealed and transported to the laboratory where a cocktail, consisting of a desorbing agent plus liquid scintillant, is introduced into the vial. After an appropriate time needed for desorption, the radon intensity is counted by standard liquid scintillation counting techniques. Procedures have been invented for desorbing the radon from the charcoal without taking the charcoal or its container out of the vial. The invention results in a simple, inexpensive radon tester and testing procedure which requires no special expertise to manufacture, to use or to process.

To summarize, after radon is adsorbed from air on an adsorbent in a detector container placed, e.g. in a habitat, and the container is returned to the laboratory liquid scintillation desorbent is introduced directly into the detector container so that the radon is desorbed in situ and, thereafter, without removing the adsorbent, the detector container is introduced into the scintillation counter and the concentration of radon is measured with the counter. Preferably, the detector container is a vial of the type adapted for use in liquid scintillation counter, the vial having means enabling introduction of the liquid scintillation desorbent into the vial and having a light-transmissive wall capable of passing light from scintillations in the liquid to the scintillation counter. In preferred embodiments, the adsorbent is contained in a porous holder into which the radon can diffuse with a selected diffusion constant; the adsorbent is spaced above the bottom of the container; the absorbent is held in the detector container by an air-pervious retainer which allows air to circulate in a controlled manner to the inner volume of the detector container below the adsorbent so that adsorption can take place from upper and lower sides of the adsorbent; passage means are provided for introducing liquid scintillating desorbent, by-passing the adsorbent, into the bottom volume of the container; the passage is adapted to enable introduction of the liquid by means of a hypodermic syringe; a passage is adapted to enable introduction of the liquid by pouring the adsorbent into the bottom of the container; the wall of the container below the adsorbent is light transmissive whereby scintillation light from the liquid can pass through the wall of the container for detection with little attenuation by the adsorbent; the adsorbent is intimately mixed with a desiccant adapted to inhibit the uptake of water vapor into the adsorbent; desiccant to adsorb water vapor is located preceding the adsorbent to cause the radon-bearing air of the environment to pass through the desiccant prior to reaching the adsorbent; the adsorbent is activated charcoal.

In one preferred method, desorption consists of introducing the liquid scintillating desorbent into the container and beneath the radon-bearing adsorbent, capping the container and inverting it so that the adsorbent is saturated with the liquid, and the container, thereafter, is righted for insertion into the liquid scintillation counter.

In another preferred method, the desorption consists of introducing the liquid scintillating desorbent into the container beneath the radon-bearing adsorbent, capping the container and inverting it, and subjecting the container to a temperature regime which efficiently desorbs the radon from the adsorbent into the liquid, and the container, thereafter, is righted for insertion into the liquid scintillation counter. In still another preferred method, liquid held in the bottom of the container is permitted to contact radon-bearing adsorbent held thereabove, and the desorption, at room or elevated temperature, proceeds by distribution of the liquid through the adsorbent by capillary action.

BRIEF DESCRIPTION OF THE DRAWINGS

The structure and operation of preferred embodiments of the invention will be described with reference to the accompanying drawings in which:

FIG. 1 is a diagrammatic, cross-sectional view of an assembled preferred embodiment showing the charcoal canister retained in the neck of a liquid scintillation vial. FIG. 1a is a diagrammatic, cross-sectional exploded view of the preferred embodiment of FIG. 1. FIG. 1b is a diagrammatic view of three examples of air and liquid permeable devices which retain the charcoal canister in the liquid scintillation vial.

FIG. 2a shows the detector capped for transportation. FIG. 2b shows the detector during the adsorption of the radon from the air. FIG. 2c shows schematically the liquid scintillant cocktail being introduced to the bottom of the vial. FIG. 2d shows the standard elution procedure with the vial inverted. FIG. 2e shows, schematically and not to scale, the detector being viewed by the LS photomultipliers for counting the scintillation light given off when the alpha and beta particles slow down and stop in the cocktail.

DESCRIPTION OF THE PREFERRED EMBODIMENTS

Figure 2E:
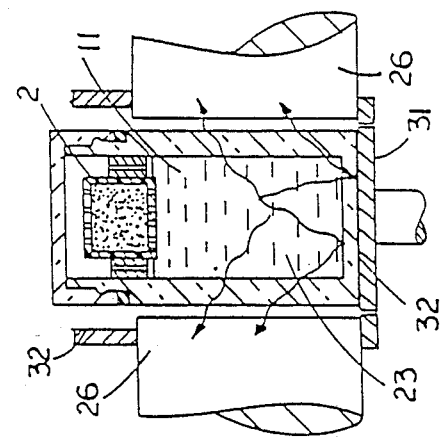
FIGS. 2a, 2b, 2c, 2d and 2e are a series of cross-sectional diagrammatic views of the detector for explaining the use of the adsorption-desorption detector.

Referring to FIG. 1, the basic elements of the detector consist of a liquid scintillation vial 1 in which a canister 2 containing activated charcoal 3 is held in the neck 4 of the vial 1 by a retainer 5. The liquid scintillation vial 1 is made of glass or plastic and has a secure, leak-proof cap 6. The vial has a maximum diameter of about 1.2" and a maximum height of about 2", both dimensions being dictated by the requirements of the liquid scintillation detectors on the market. The vial 1 is made of material which has minimal radioactivity and which is transparent to the scintillation light emitted by the cocktail. Such vials may be purchased at modest cost from many companies. We prefer the 20 cc plastic liquid scintillation vials made by Beckman Instruments which have a slightly tapered bore 7. The canister 2 containing the clean activated charcoal is made of plastic. Its top 8 and bottom 9 are porous with hundreds of small holes to allow air to enter and reach the charcoal. Such canisters are manufactured for the food and drug industry and are commercially available to customer specification. The preferred embodiment uses 2 g of clean, activated charcoal made from coconut or rosewood. The 2 g adsorbs the radon from about 8 liters of air and has sensitivity to radon down to at least 0.2 pCi/l. We have successfully used canister containing from 1 to 3 g, the latter being sensitive to almost 0.1 pCi/l in counting times of only 5 minutes. The retainer ring 5, holds the canister 2 snugly in place in the neck 4 of the vial 1, has passages 10 to allow air to circulate to the canister bottom 9 and to allow the cocktail to be introduced into the vial space 11. The air passages 10 may take many forms as exemplified in FIG. 1b: e.g., a number of small holes 12, a spiral groove 13, or, our preference, a simple split 14. Ring 5 may be composed of any rigid or semi-rigid material which is inert to the liquid scintillant cocktail. We have found that a standard split ring, $\frac{3}{4}$"I.D., $\frac{7}{8}$" O.D. with a standard opening of about 0.25" makes an effective retaining ring allowing ample circulation of air into the interior of the vial and hence to the bottom 9 of the canister. We have successfully used plastic, metal, and special chemical resistant "O" rings. A commercial 2 g activated charcoal getter canister 2 held in the neck 4 (as shown in FIG. 1) leaves about 10 cc of space 11 in the bottom of the 20 cc that we use. This space is sufficient for an effective amount of scintillant cocktail.

The complete protocol which utilizes the special features of the detector of Fig. 1 will now be described with reference to FIG. 2.

Figure 2D:
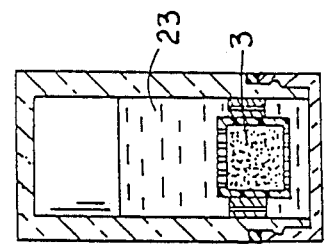
Figure 2C:
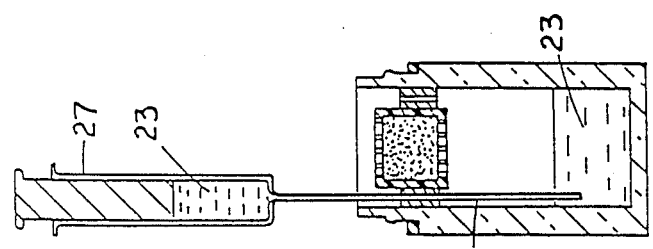
Figure 2B:
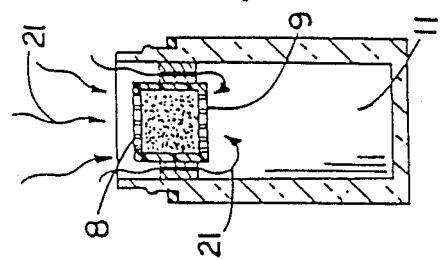
Figure 2A:
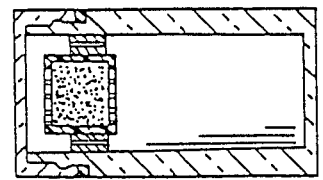

FIG. 2a shows the detector vial capped for transportation. The cap on a standard commercial LS vial is very well sealed, though we have found it wothwhile to add a square "O" ring 19 made of Viton so as to make an extra seal at the cap-vial junction 20. We have made tests to show that a tightly sealed 20 cc Beckman Instruments vial has a radon diffusion time constant of several years so that the detectors have essentially infinite shelf lives before use and no leakage of radon out of the canister after adsorption.

FIG. 2b shows the detector in use. The radon test begins when the tester uncaps the vial, exposing the charcoal-filled canister 2 to the ambient radon-bearing air 21. The radon diffuses into the charcoal through the holes in the top 8 and bottom 9 of the canister. The diffusion time depends on the resistance of the air paths to radon. We have designed detectors, shown in FIG. 1, which take from 1 to as much as 4 days for the charcoal to become (95%) saturated with the ambient radon. After 2 days, typically, the detector is capped as in FIG. 2a, and transported to the liquid scintillator.

FIG. 2c shows the liquid scintillant cocktail 23 being introduced into the space 11 beneath the canister 2 using a syringe 27 with a hypodermic needle 24. We find that standard laboratory syringes with #19 needles work easily and rapidly. The vial is then recapped and inverted, as shown in FIG. 2d.

FIG. 2d shows the inverted vial during the desorption of the radon from the charcoal into the scintillant cocktail 23 containing xylene. The cocktail completely soaks the charcoal 3. If the inverted vial is kept at an elevated temperature, whose limit is determined by the properties of the materials used, then the desorption can be completed in much less than the three hours it takes for the radon progeny to reach radioactive equilibrium with the radon. We have found that 30° C. for one hour is ample with our detector. Once the desorption is complete, the detector is righted and placed in an LS counter, where it is transported by an elevator 31 to a light tight counting well 32 with reflecting walls to maximize the light collection.

FIG. 2e shows the detector in the counting position in the liquid scintillator. The liquid scintillation cocktail 23 is now in the bottom 11 of the vial 1 and the opaque charcoal-filled canister 2 is at the top vial 1, and largely under the cap 6. Photomultipliers 26 see a clear scintillant liquid 23 containing the radon; there is almost no attenuation of the scintillant light and the signal is strong. As a consequence, the signal stands out well over the background counts which are mainly low energy pulses. We note that:

The total hands-on time for desorption of a vial is under one minute. It is only the time needed to open the vial, insert the scintillant, close and invert the vial, and place it in the LS counter.

The vial 1, "O" ring 19, and retainer 5, are all recyclable. On the other hand, each of these components can be made cheaply so as to make an economic, disposable, radon detector.

The detector, shown in FIG. 1 and the method, shown in FIG. 2, results in a protocol for liquid scintillation measurement of radon in the air which is as simple as that used for gamma ray detection.

The method shown in FIG. 2, using the detector of FIG. 1 is rapid, quantitative, accurate, and reproducible. Its one deficiency is that one cannot account for the moisture uptake in the charcoal. The uptake of water vapor by the charcoal reduces its ability to absorb radon and should, at least in certain cases, be taken into account. Moisture uptake is not a problem when the relative humidity is below about 50%, since the correction is less than than 10% for a two day exposure. But if the relative humidity of the radon-bearing air is greater than about 70%, then either the effect of moisture uptake must be accounted for or the moisture must be prevented from being adsorbed by the charcoal. Both methods are practical. The correction for uptake of water vapor can be made accurately by determining the weight of moisture by the simple procedure of weighing the detector before and after exposure to an accuracy of a few percent. To reduce the moisture correction to negligible proportions without increasing the procedural steps we have successfully used two schemes, shown in FIGS. 3 and 4.

Figure 3:
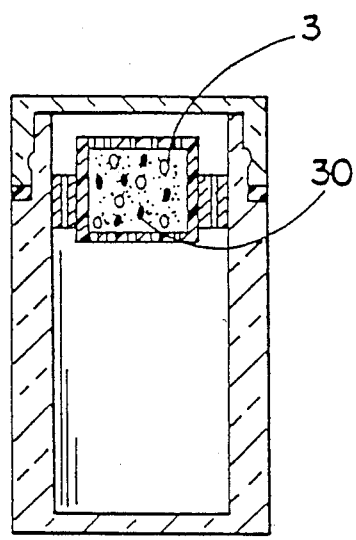
FIG. 3 A diagrammatic, cross-sectional vie of an adsorb-desorb radon detector in which desiccant is mixed with the activated charcoal to reduce water vapor uptake in the adsorbent.

FIG. 3. is a schematic representation of the detector which in all respects but one is similar to that of FIG. 1. The exception is the addition to the canister 2 of desiccant. In practice, one fills the plastic canister 2 with about 1 g to 2 g of clean activated charcoal 3 and adds about an equal volume of silica gel 30, or other desiccant. The desiccant may be mixed with the charcoal or layered. The procedures of FIG. 2 are unchanged. The desiccant preferentially adsorbs the water vapor and keeps the charcoal dry. Its presence does not effect the counting though we have found that the presence of the desiccant changes the diffusion rate. The saturation time for such a detector is a fixed number for a specific preparation of the detector.

Figure 4:
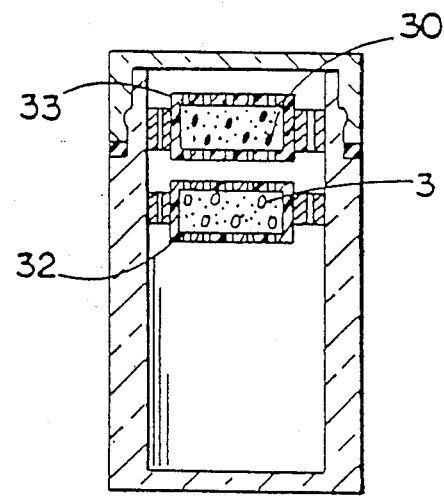
FIG. 4 A diagrammatic, cross-sectional view of an adsorb-desorb radon detector in which the desiccant is placed in the path between the radon-bearing air and the adsorbent.

FIG. 4. shows, diagrammatically, another method to keep the charcoal dry. In this configuration, only 1 g of charcoal is used in a canister 32 which is half as high as the canister 2. A second half-height canister 33 filled with desiccant is placed at the top of the vial so that the radon bearing air must pass through or close to the desiccant before entering the charcoal. (One gram of charcoal is sufficient for measuring radon levels below 0.5 pCi/l.) This method is very successful at keeping the charcoal dry.

Figure 5:
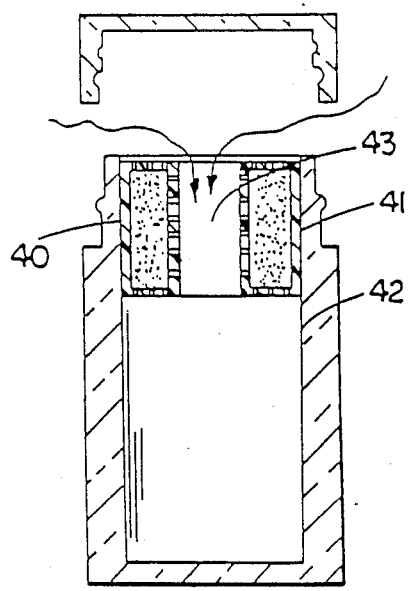
FIG. 5 A diagrammatic, cross-sectional view of a preferred embodiment consisting of only two parts, the vial and the canister containing the charcoal, with or without desiccant.
Figure 6:
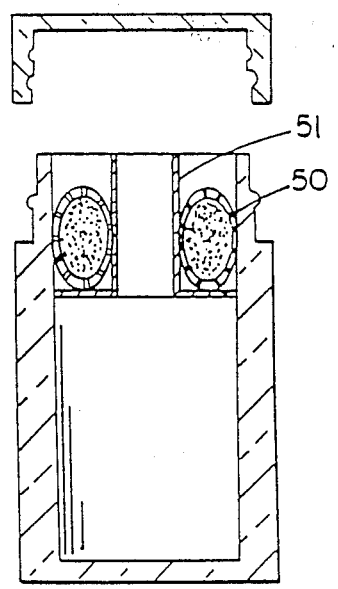
FIG. 6 A diagrammatic, cross-sectional view of a preferred embodiment in which the charcoal, with or without desiccant, is a porous sack which is held on a mandrel in the neck of the vial.

The preferred embodiment shown in FIG. 1 has the advantage that every component is simple and inexpensive. The vials are for standard LSC and cost pennies apiece; the "O" ring—which is not essential but does add some security to the shelf life of the detector—is from a commercial catalogue; the charcoal canisters are also commercially available both with and without desiccants and they too cost pennies apiece; the split ring is also commercially available at low cost. If, however, one were to design all parts ab initio, then a preferred embodiment would consist of just two entities, the vial with a secure sealable top and a charcoal containing canister or pouch with a porosity designed for the desired diffusion time. FIG. 5 and FIG. 6 give examples of such preferred embodiments.

FIG. 5. shows a liquid scintillation vial similar to that of FIG. 1. The charcoal is now contained in a hollow canister 40, shaped in the form of a ring which has an outside circumference 41 which makes a press fit with the inner wall 42 of the vial 1. Since some of the commercial LSC vials have a tapered inner wall 42, it may be advisable to taper the outer circumference 41 to match. The canister 40 is porous with many holes designed to retain the activated charcoal while admitting the radonbearing air with the desired diffusion time-constant. The protocol for using this detector is essentially the same as that of FIG. 2. The advantage of the design is that the retainer ring 5 is eliminated and the filling of the vial 1 with cocktail can be done easily and automatically through the large hole 43, using commercially available pipettes.

FIG. 6 shows a variant of FIG. 5 which uses a commercially available charcoal "getter" bag which contains two grams of activated charcoal in a porous sack 50. The sack 50 is mounted on a hollow mandrel 51 and pushed in place in the vial 1. Charcoal-filled "getter" bags which fit the configuration of FIG. 6 are commercially available at low cost specified amounts of activated charcoal and desiccant. The one disadvantage that we have found with this arrangement is that the diffusion rate, and hence the intensity calibration, is sensitive to variations in placing the sack in the canister. Thus, the assembly procedure is critical and there may be changes in the orientation of the canister during shipping and handling unless auxiliary retention methods are used.

An important feature of the design of FIGS. 1–6 is that the adsorbent is retained in the top of the vial 1 and the desorption accomplished without change in the detector configuration. We note, however, that many of the essentials of the method are retained with the adsorbent in the bottom or other parts of the vial. The LSC cocktail, introduced into the vial, will desorb the radon from the activated charcoal into the LSC cocktail. This alternative approach results in a reduced sensitivity, however, since the adsorbent is in the path of the light to the photomultipliers and there is a substantial quenching of the light, which reduces the signal and thus decreases the ratio of the radon signal to the background noise signal. The result is a lower sensitivity to radon intensity that can be obtained by the preferred embodiment.

An alternative design which maintains the advantage of not disturbing the activated charcoal canister, but gives up the single-vial feature, fixes the activated charcoal in the cap of the LS vial rather than in the neck. Detection is carried out by exposing the charcoal canister in the cap to the air. The vial used to seal the charcoal for shipping need not be the same vial as is used for counting. There is no advantage of this method over the preferred embodiment if commercial 22 ml LS vials are used, but the method might be advantageous for use with 6 ml LS vials. The charcoal canister would then be in the form of a long porous cylinder. At the cost of some loss of sensitivity to radon, one may design a very small detector which could be useful in some circumstances.

FIG. 2c shows the LSC cocktail being introduced into the vial 1. The amount of cocktail 23 is such that the top of the liquid is below the bottom 9 of the canister 2 when the vial is upright. It is then natural to invert the vial as shown in Fig. 2d so that the charcoal becomes immersed in the cocktail and the radon is effectively desorbed from the charcoal into the desorbent such as toluene or xylene. When, as in FIG. 2e, the vial is righted for counting, the cocktail 23 is well below the bottom 9 of the charcoal canister 2 and the contents of the canister 2 cannot effect the counting. We have found that the inversion step is not necessary. An equally effective procedure is to add sufficient cocktail in step FIG. 2c to just cover the bottom 9 of the canister 2. About 10 cc of cocktail is needed for the 2 g canister and about 7 cc are needed for the 3 g canister. Capillary action then takes the cocktail into the charcoal canister and, within minutes, the charcoal is effectively immersed in the cocktail and desorption takes place. If the vial is allowed to sit undisturbed for 8 hours, then more than 95% of the radon is eluted into the cocktail. In practice, the vial is placed in the LSC holder and counted automatically 8 hours afterwards. The procedure takes somewhat longer and uses more cocktail than does the preferred embodiment, but it simplifies the procedure and eliminates the possibility of leakage due to a poorly fitting cap.

Although the invention has been described with respect to certain preferred embodiments, it will be apparent to those skilled in the art that various changes may be made in keeping with the broader principles of the invention, the scope which is defined in the appended claims.

I claim:

1. In a method of measuring the concentration of radon in air by adsorption of radon with an adsorbent in a detector container and subsequent desorption of the radon into a liquid scintillation desorbent and measurement of the radon in the desorbent with a liquid scintillation counter, the improvement comprising:

introducing the liquid scintillation desorbent into the detector container to effect desorption of the radon from the adsorbent in situ and, thereafter, without removing the adsorbent from the detector container, introducing the detector container into the liquid scintillation counter for measurement of the desorbed radon with the liquid scintillation counter.

2. The improvement of claim 1, wherein the liquid scintillation desorbent is introduced into a portion of the detector container beneath the adsorbent, the detector container is capped and then inverted to saturate the adsorbent with the liquid scintillation desorbent, and the container is thereafter righted for insertion into the liquid scintillation counter so that light produced from scintillations induced by radioactive decay of desorbed radon may pass through a light-transmissive wall of the detector container, unimpeded by the adsorbent, for detection by the liquid scintillation counter.

3. The improvement of claim 1, including subjecting the detector container to a temperature regime to accelerate desorption of radon from the adsorbent into the liquid scintillation desorbent.

4. The improvement of claim 1, including exposing the adsorbent to the liquid scintillation desorbent in such a manner that the liquid scintillation desorbent distributes through the adsorbent by capillary action.

5. For use in a method of measuring the concentration of radon in air by adsorption of radon with an adsorbent in a detector container and subsequent desorption of the radon into a liquid scintillation desorbent and measurement of the radon in the desorbent with a liquid scintillation counter, an improved detector container comprising:

a vial of a type adapted for use in liquid scintillation counters, and air- and liquid-pervious means supported within said vial and containing a radon adsorbent, said vial having means enabling the introduction of the liquid scintillation desorbent into said vial in order to effect desorption of radon from said adsorbent in situ, without removal of said adsorbent from said vial.

6. A detector container according to claim 5, wherein said adsorbent containing means comprises a porous holder having a predetermined diffusion time-constant for radon-bearing air.

7. A detector container according to claim 5, comprising means supporting said adsorbent containing means at a position spaced above a bottom of said vial.

8. A detector container according to claim 7, wherein said supporting means is adapted to allow air to circulate in a controlled manner to the inner volume of said vial below said adsorbent, so that adsorption can take place from upper and lower sides of said adsorbent.

9. A detector container according to claim 7, including passage means bypassing said adsorbent for enabling introduction of the liquid scintillation desorbent directly into the inner volume of said vial below said adsorbent.

10. A detector container according to claim 9, wherein said passage means is adapted to enable introduction of the liquid scintillation desorbent by means of a hypodermic syringe.

11. A detector container according to claim 9, wherein said passage means is adapted to enable pouring of the liquid scintillation desorbent into the inner volume of said container below said adsorbent.

12. A detector container according to claim 7, wherein said vial has a light transmissive wall portion below said adsorbent such that scintillation light from said liquid scintillation desorbent can pass through said wall for detection by the liquid scintillation counter, without being attenuated by said adsorbent.

13. A detector container according to claim 5, wherein said adsorbent is intimately mixed with a desiccant.

14. A detector container according to claim 5, including means supporting a desiccant in said vial in such a position that radon-bearing air passes through said desiccant prior to reaching said adsorbent.

15. A detector container according to claim 5, wherein said adsorbent is activated charcoal.

16. A radon detector comprising a liquid scintillation vial having a closeable top, a bottom, and light-transmissive wall, said vial being adapted to rest on its bottom, holder means supporting a radon adsorbent within said vial at a position spaced from said bottom of said vial for exposing said adsorbent to ambient air, and passage means bypassing said adsorbent for conducting air from above said adsorbent past said adsorbent to a portion of said vial below said adsorbent, said adsorbent thus being exposed from above and, via said passage, from below when said vial is opened to the ambient air, said vial being further adapted to receive liquid scintillating desorbent to desorb radon adsorbed by said adsorbent from the ambient air.

17. A radon detector comprising a radon adsorbent retained in a liquid scintillation vial having a closeable top, a bottom, and a light-transmissive wall, said vial being adapted to rest on its bottom in a liquid scintillation counter and to hold below said adsorbent a radon-carrying liquid scintillating desorbent which has been exposed to said adsorbent to desorb radon therefrom, whereby light produced from scintillations induced by radioactive decay of said radon may pass, unimpeded by said adsorbent, through said light-transmissive wall for detection by a photodetector of the liquid scintillation counter.

* * * * *